US008319138B2

(12) United States Patent
Gunzelmann

(10) Patent No.: US 8,319,138 B2
(45) Date of Patent: Nov. 27, 2012

(54) INERT GAS TUBE AND CONTACT TUBE OF AN APPARATUS FOR IMPROVED NARROW-GAP WELDING

(75) Inventor: Karl-Heinz Gunzelmann, Nürnberg (DE)

(73) Assignee: Siemens Aktiengesellschaft, München ( * ) Notice: Subject to any disclaimer, the term of this patent is extended or adjusted under 35 U.S.C. 154(b) by 386 days.

(21) Appl. No.: 12/694,376

(22) Filed: Jan. 27, 2010

(65) Prior Publication Data
US 2010/0193477 A1    Aug. 5, 2010

(30) Foreign Application Priority Data
Feb. 5, 2009 (EP) .................................... 09001615

(51) Int. Cl.
*B23K 9/16* (2006.01)
(52) U.S. Cl. ........................................................ 219/74
(58) Field of Classification Search ..................... 219/74
See application file for complete search history.

(56) References Cited

U.S. PATENT DOCUMENTS

| 2,735,920 A | 2/1956 | Valliere |
| 2,827,550 A | 3/1958 | Unrath |
| 3,992,603 A * | 11/1976 | Reynolds ....................... 219/136 |
| 4,289,950 A | 9/1981 | Griebeler |
| 4,575,612 A | 3/1986 | Prunier |
| 4,667,083 A * | 5/1987 | Stol ............................... 219/136 |
| 4,672,163 A | 6/1987 | Matsui |
| 6,759,623 B2 * | 7/2004 | Enyedy ........................... 219/75 |

FOREIGN PATENT DOCUMENTS

| DE | 3220242 A1 | 12/1983 |
| DE | 3841325 A1 | 6/1990 |
| EP | 0 557 757 A1 | 9/1993 |
| WO | WO 2007050689 A1 | 5/2007 |

OTHER PUBLICATIONS

H. Nakajima, A. Nagai and S. Minehisa, "Rotating Arc Narrow Gap MIG Welding Process", The State-of the-Art in Japan, The Japan Welding Soc., Tokio, 1986, pp. 65-73, Others; 1986.
Communication From European Patent Office, Mar. 22, 2012, pp. 1-5.

* cited by examiner

*Primary Examiner* — Luan C Thai

(57) ABSTRACT

An apparatus for improved narrow-gap welding is provided. The apparatus includes an inert gas tube within which a contact tube is arranged, the contact tube includes a wire feed for a melting wire. The end of the inert gas tube is ceramic. In another embodiment, the inert gas tube of the apparatus includes a plurality of materials with a high thermal conductivity. A first metallic material at the end of the inert gas tube has a higher thermal conductivity than a second material at a start of the inert gas tube. The first metallic material is molybdenum, tungsten, an alloy of molybdenum or tungsten, or copper or a copper alloy.

12 Claims, 4 Drawing Sheets

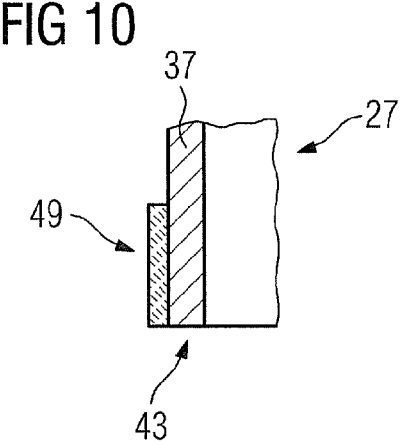
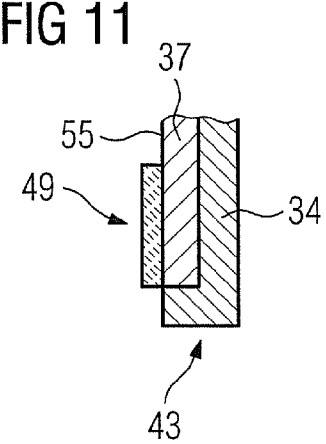
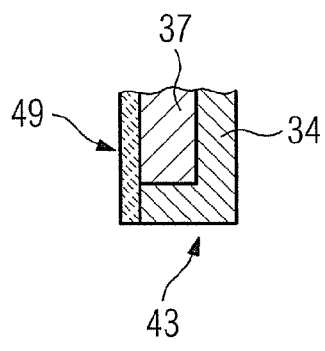
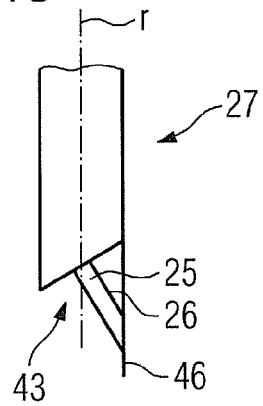
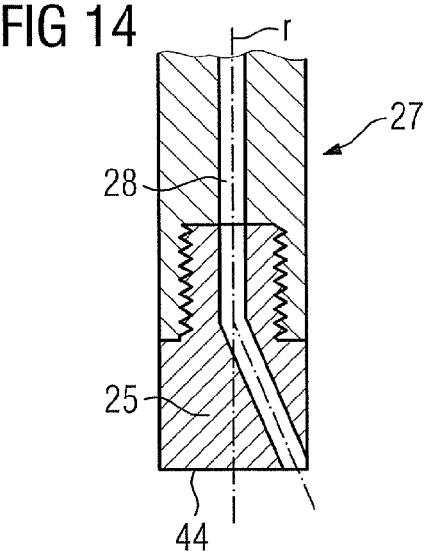

INERT GAS TUBE AND CONTACT TUBE OF AN APPARATUS FOR IMPROVED NARROW-GAP WELDING

CROSS REFERENCE TO RELATED APPLICATIONS

This application claims priority of European Patent Office application No. 09001615.5 EP filed Feb. 5, 2009, which is incorporated by reference herein in its entirety.

FIELD OF INVENTION

The invention relates to a method for narrow-gap welding using the MIG welding process, in which the welding device is guided in the weld joint and, in the process, at least one melting wire electrode, which is passed through an inert gas tube, is supplied to the welding area in inert gas at a predetermined wire feed rate, and in which the parameters welding current, electrode wire feed and inert gas tube separation are set such that a rotating arc is formed at the end of the wire electrode. Because of the many possible ways in which it can be used, its good capability for mechanization and high productivity, MIG welding is one of the most widely used arc fusion welding processes. The economy of this known method can in this case be improved even further by reducing the required joint cross section and by changing to narrow-gap welding. However, in the case of deep and narrow weld joints, the insertion of the welding device into the joint and the positioning of the melting wire electrode lead to problems relating to the workpiece flanks to be connected. The risk of bonding faults on the workpiece flanks is in consequence relatively high, particularly in the case of burning-cut workpiece flanks and when the gap tolerances resulting from this are high. In the case of narrow-gap welding using the MIG welding process, the arc which is produced between the wire electrode and the workpiece should be faulted alternately on the two workpiece flanks. Until now this has been achieved by mechanical deflection of the wire electrode, in which case a distinction is drawn between static and dynamic process principles. In the case of static process principles, two wire electrodes are plastically defaulted or mechanically guided such that the ends of the wire electrodes are each deflected toward one workpiece flank. In dynamic process principles, the ends of a wire electrode oscillate to and fro between the two workpiece flanks, or two twisted wire electrodes are supplied, which then assume different positions with respect to the workpiece flanks as they melt.

BACKGROUND OF INVENTION

A further variant of the dynamic process principles is known from Narrow Gap Welding-The State-of-the-Art in Japan, The Japan Welding Soc., Tokyo, 1986, pages 65 to 73, in which the wire electrode is plastically deformed to form a helix by a rotating wire directing means, thus resulting in the end of the wire electrode carrying out a rotary movement during the welding process.

EP-A-0 557 757 discloses a method for narrow-gap welding of the type mentioned initially, in which the parameters welding current, electrode wire feed and inert gas tube separation are set without any mechanically activated electrode movement, in such a way that the normal axial material junction is dissolved by a rotating material with a rotating arc.

Both in the case of narrow-gap welding with a deflected wire electrode and in the case of narrow-gap welding with the arc itself being rotated, the weld joint width which can be bridged is limited as a result of which there is a risk of flank bonding faults when the gap widths are relatively large for production reasons.

SUMMARY OF INVENTION

The invention is based on the object of providing an apparatus for narrow-gap welding using the MIG welding process, in which good weld results can be ensured even with relatively large gap widths and in particular in the case of production-dependent gap tolerances.

This object is achieved by an apparatus as claimed in the claims and by a method of this generic type for narrow-gap welding as claimed in the claims.

Advantageous refinements of the invention are specified in the dependent claims.

The solution is in each case achieved by:

an apparatus (SE), in particular for narrow-gap welding, which has an inert gas tube (60), within which (60) a contact tube (27) is arranged, having a wire feed (28) for a melting wire (30), wherein the inert gas tube (60) has active cooling, and in particular has cooling tubes for cooling, an apparatus (SE), in particular for narrow-gap welding, which has an inert gas tube (60), within which (60) a contact tube (27) is arranged, having a wire feed (28) for a melting wire (30), wherein the inert gas tube (60) is rectangular, an apparatus (SE), in particular for narrow-gap welding, which has an inert gas tube (60), within which (60) a contact tube (27) is arranged, having a wire feed (28) for a melting wire (30), wherein, at least at the end (31), in particular only at the end (31), the inert gas tube has materials with a high thermal conductivity, wherein, in particular, the metallic material at the end (31) of the inert gas tube (60) has a higher thermal conductivity than that at the start (23) of the inert gas tube (60), and very particularly has molybdenum (Mo), tungsten (W) or their alloys, or copper (Cu) or a copper alloy, an apparatus (SE), in particular for narrow-gap welding, which has an inert gas tube (60), within which (60) a contact tube (27) is arranged, having a wire feed (28) for a melting wire (30), wherein, at least at the end (28), in particular only at the end (28), the inert gas tube (60) is ceramic, an apparatus (SE), in particular for narrow-gap welding, which has an inert gas tube (60), within which (60) an elongated contact tube (27) is arranged, having a wire feed (28) for a melting wire (30), wherein, the contact tube (27) is formed from an inner core (34) composed of a second material and from an outer jacket (37) composed of a first material, wherein the jacket (37) sheaths the majority of the inner core (34), in particular at least 90% of it, wherein the first material (37) is not the same as the second material (34), in particular wherein the second material (34) has an alloy with a high thermal conductivity, very particularly in that the thermal conductivity of the second material (34) is higher than that of the first material (37), in particular wherein the second material (34) has copper or a copper alloy, an apparatus (SE), in particular for narrow-gap welding, which has an inert gas tube (60), within which (60) an elongated contact tube (27) is arranged, having a wire feed (28) for a melting wire (30), wherein the contact tube (27) is formed from an inner core (34) and an outer jacket (37), wherein, at least at the end (43), in particular only at the end (43), the contact tube (27) has a non-stick coating (49) on the outer jacket surface, in particular a ceramic coating (13), and wherein the coating (49) is applied to the jacket (37) and/or to the inner core (34), an apparatus (SE), in particular for narrow-gap welding, which has an inert gas tube (60), within which (60) an elongated contact tube (27) is arranged, having a wire feed (28) for a melting wire (30), wherein the contact tube (27) is formed from an inner core (34) and an outer jacket (37), and wherein, only at the end (43) of the contact tube (27), the inner core (34) forms a part (52) of the outer jacket surface of the contact tube (27), an apparatus (SE), in particular for narrow-gap welding, which has an inert gas tube (60), within which (60) a contact tube (27) is arranged, having a wire feed (28) for a melting wire (30), wherein the contact tube (27) has an end (43) with an end face (44) and a longitudinal axis (r), and wherein the longitudinal axis (r) forms an angle other than 90° with the end face (44) of the end (43), an apparatus (SE), in particular for narrow-gap welding, which has an inert gas tube (60), within which (60) a contact tube (27) is arranged, having a wire feed (28) for a melting wire (30), wherein the contact tube (27) has a contact nozzle (25) at the end, wherein the contact tube (27) has a jacket surface, and wherein one end of the contact nozzle (25) does not project beyond an imaginary extension (46) of the jacket surface in the longitudinal direction of the contact tube (27), an apparatus (SE), in particular for narrow-gap welding, which has an inert gas tube (60), within which (60) a contact tube (27) is arranged, having a wire feed (28) for a melting wire (30), wherein the contact tube (27) is coolable, in particular in the interior (34).

Each of these individual ideas mentioned above can be improved by one or more of the following measures, when the inert gas tube (60) is rectangular, the inert gas tube (60) has active cooling, in particular cooling tubes and in particular at the end (31), at least at the end (31), in particular only at the end (31), the inert gas tube has materials with a high thermal conductivity, wherein, in particular, the metallic material at the end (31) of the inert gas tube (60) has a higher thermal conductivity than at the start of the inert gas tube (60), and very particularly has molybdenum (Mo), tungsten (W) or their alloys, or copper (Cu) or a copper alloy, at the end (28), in particular only at the end (28), the inert gas tube (60) is ceramic, the contact tube (27) is formed from an inner core (34) composed of a second material and from an outer jacket (37) composed of a first material, wherein the jacket (37) sheaths the majority of the inner core (34), in particular at least 90% of it, wherein the first material (37) is not the same as the second material (34), in particular when the second material (34) has an alloy with a high thermal conductivity, very particularly when the thermal conductivity of the second material (34) is higher than that of the first material (37), in particular when the second material (34) is copper or a copper alloy, the contact tube (27) is formed from an inner core (34) and an outer jacket (37), when, at least at the end (43), in particular only at the end (43), the contact tube (27) has a non-stick coating (49) on the outer jacket surface, in particular a ceramic coating (13), and when the coating (49) is applied to the jacket (37) or to the inner core (34). The contact tube (27) is formed from an inner core (34) and an outer jacket (37), and when, only at the end (43) of the contact tube (27), the inner core (34) forms a part (52) of the outer jacket surface of the contact tube (27), the contact tube (27) has an end (43) with an end face (44) and a longitudinal axis (r), and when the longitudinal axis (r) forms an angle other than 90° with the end face (44) of the end (43), the contact tube (27) has a contact nozzle (25) at the end, when the contact tube (27) has a jacket surface, and when one end of the contact nozzle (25) does not project beyond an imaginary extension (46) of the jacket surface in the longitudinal direction of the contact tube (27), the contact tube (27) is coolable, in particular in the interior (34), the non-stick coating (49), in particular the ceramic coating (13), does not extend over the outer surface (55), which is formed by the inner core (34) of the contact tube (27), the inert gas tube (60) is ceramic (28) at the outermost end (13), and a block (31) of higher thermal conductivity is provided above the ceramic part (28), in which, before emerging from the contact tube (27), the wire feed (28) has a bent profile for the wire (30).

BRIEF DESCRIPTION OF THE DRAWINGS

FIGS. 1 to 14 show exemplary embodiments of the invention.

DETAILED DESCRIPTION OF INVENTION

Figure 1:
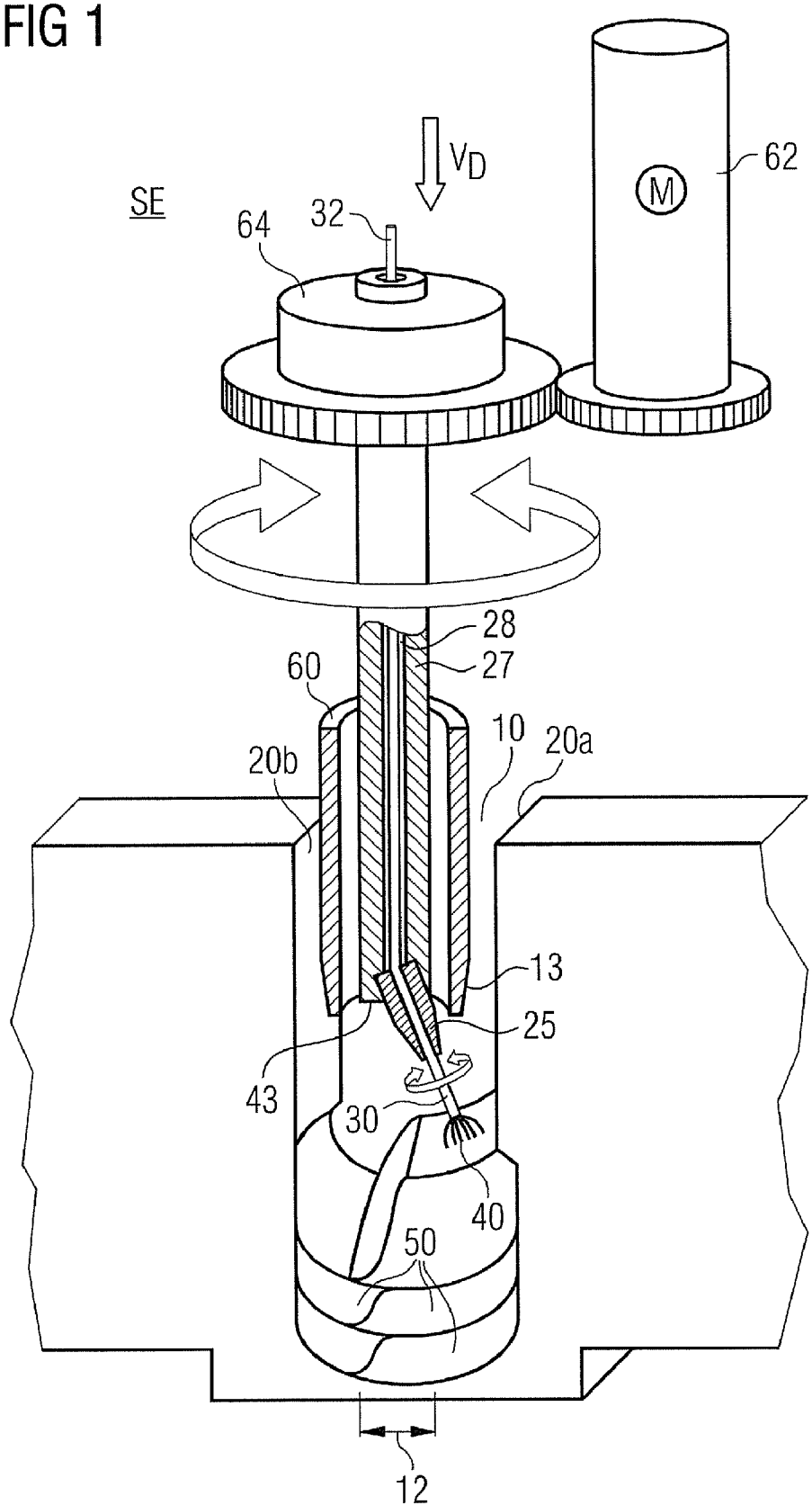

The narrow-gap welding method, in particular the under-powder narrow-gap welding method, is preferably carried out using a welding device SE as is illustrated schematically in FIG. 1, and this is also possible with a powder feed instead of by a wire being fed.

This welding method is preferably used to connect opposite workpieces along their workpiece flanks 20a, 20b with the aid of a weld bead. The welding device SE comprises a wire electrode 30 which is fed to the position for welding within an inert gas tube 60 in a contact tube 27 with a wire feed. The wire electrode 30 is fed to the welding position via a feed 32 at a speed VD, and it emerges from the metallic contact nozzle 25.

Powder can also be supplied instead of the wire.

The inert gas tube 60 with the wire electrode 30 is preferably connected to a motor 62 via a gearbox 64. By rotation in alternating directions, the motor 62 produces an oscillating movement of the wire electrode 30 within the gap 10, and the amplitude of this movement is variable. The welding device SE is positioned and moved within the gap 10 with respect to the workpiece flanks 20a, 20b, which can be seen from above, while the motor 62 produces the oscillating movement at the desired amplitude of the wire electrode 30 within the gap 10. The arc 40 of the welding device SE is adjusted by means of the parameters welding current, welding voltage, electrode wire feed rate and distance between the uppermost bead 50, to be precise the final welding layer, and the protective gas tube 60. This arc 40 can be configured both as a rigid arc 40 and as a rotating arc 40 with the aid of its parameters. In order to produce an optimum weld bead with a long life, the wire electrode 30 and the arc 40 carry out an oscillating movement, produced via the motor 62, between one of the workpiece flanks 20a, 20b and a central area 12 of the gap 10, and at the same time move along the gap 10. This results in production of a first bead 50, which is directly adjacent to one of the workpiece flanks 20a, 20b and extends approximately to the center of the gap 10 (cf. FIG. 2). The first bead 50 in a layer fills the gap 10 only partially, as a result of which a complete layer is formed from at least two beads 50 arranged alongside one another. During the formation a layer, the number of beads 50 may, for example, be chosen as a function of the width of the gap 10 or of the time available for the welding process. Once the first bead 50 has been formed between one of the workpiece flanks 20a, 20b and the central area 12 of the gap, the slag layer (not shown) located on the bead 50 is removed, once the powder from the under-powder narrow-gap welding process has been sucked out of the gap 10, for example. The formation of the bead 50 between only one workpiece flank 20a and the central area 12 of the gap 10 prevents the slag layer from being braced between the opposite workpiece flanks 20a and 20b thus making it more difficult to remove, or even making this impossible. The oscillating movement described above therefore results in a bead 50 which on the one hand has optimum quality and which on the other hand allows the slag which has been deposited on it and is hardened to be removed easily. Furthermore, the width of the bead 50 can be specifically matched to the width of the gap 10. In order to allow the width of the gap 10 to be reduced further, thinner wire electrode diameters are used, for example, in the course of the under-powder narrow-gap welding process. During the under-powder narrow-gap welding process, it is not possible to visually check the position of the bead 50 produced, with respect to the workpiece flanks 20a, 20b during the welding process. The above method is therefore carried out, while the welding device SE is positioned with respect to the workpiece flanks 20a, 20b, which can be seen from above, and moved along the gap 10. The oscillating movement allows continuous matching of the width of the oscillating movement and the association between the wire electrode end and the workpiece flank 20a, 20b continuously via the motor control system.

According to one further preferred embodiment, it is actually advantageous in the case of the under-powder narrow-gap welding method to use the arc 40 as a sensor for detection of the position of the arc 40 with respect to the workpiece flanks 20a, 20b and with respect to the bead 50 that has already been produced, or a complete layer. In conjunction with the arc 40 and its parameters as a sensor, it is therefore possible to automatically readjust the welding device SE with respect to the workpiece flank, as in the case of the open arc methods (TIG, MIG) without the need for visual observation and intervention, even during under-powder narrow-gap welding. For this purpose, the arc configuration is first of all preset by the choice of the welding voltage and/or welding current. During the welding process, the actual welding voltage and/or the actual welding current are/is recorded at the wire electrode 30, and evaluated. The evaluation of this data provides the position of the arc 40 with respect to the adjacent workpiece flanks 20a, 20b and with respect to the underneath of the gap 10, which is formed by a complete layer or a bead 50. After the elimination of disturbances from the recorded data, for example noise, it is possible to tell that the welding voltage/welding current characteristic of the arc 40 reacts sensitively to the distance between the wire electrodes 30 and the workpiece. This allows position monitoring of the arc 40 on the basis of the recorded actual welding data. The actual position of the arc 40 recorded from the welding data relating to the arc 40 is transmitted to the control system of the welding device SE in order—if necessary—to correct the movement of the welding device SE along the gap and/or the oscillating movement of the wire electrode 30 on the basis of the stored presets for the welding process. On the basis of this method, it is possible to carry out accurate under-powder narrow-gap welding without any visual contact with the bead 50 that is produced. Furthermore, the weld bead is not adversely affected by the slag layer that is formed on the respective bead 50, since it can easily be removed. If a wire electrode 30 with a preferred diameter of 1.2 mm is used, it is possible to achieve and reliably weld an under-powder narrow-gap bead with a joint width of about 12 mm.

Figure 2:
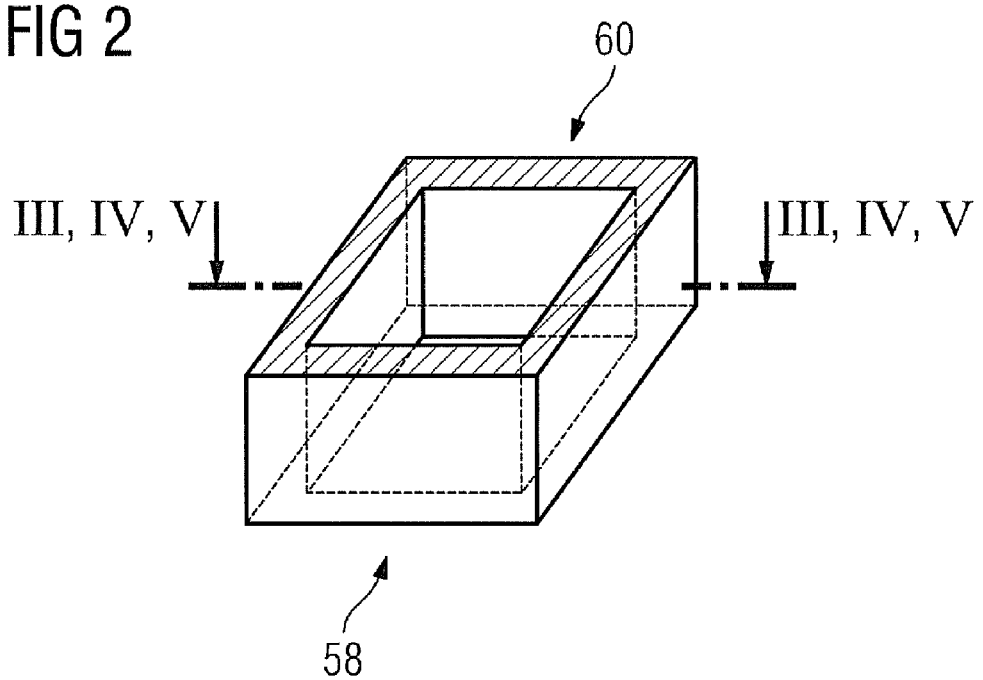

FIG. 2 shows a cross section through an inert gas tube 60, which is preferably rectangular.

At least the end 28 of the inert gas tube 60 is rectangular.

The rectangular embodiment of the inert gas tube 60 results in more mass, as a result of which heating does not take place as quickly because of the inertia of the greater mass of the inert gas tube 60.

In the prior art, the inert gas tubes are round in order to ensure that they have little mass. Precisely the opposite is desirable in this case.

The inert gas tube 60 preferably has cooling. The cooling is preferably formed in the interior of the inert gas tube 60 (not illustrated). Water cooling is preferably used.

The inert gas tube 60 is particularly preferably cooled via cooling lines, preferably on the end faces (not shown).

The cooling lines are preferably in the form of tubes on the inner surface of the inert gas tube 60 and are thermally connected to the inert gas tube 60, preferably by soldering or welding. The cooling lines may also be Banned integrally in the inert gas tube 60.

Figure 3:
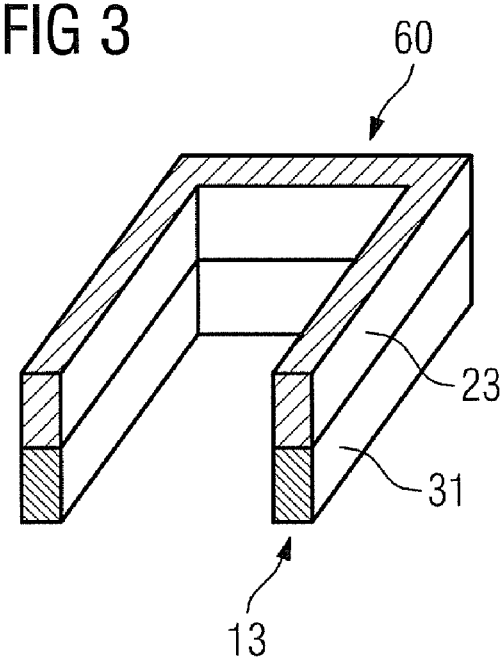
Figure 4:
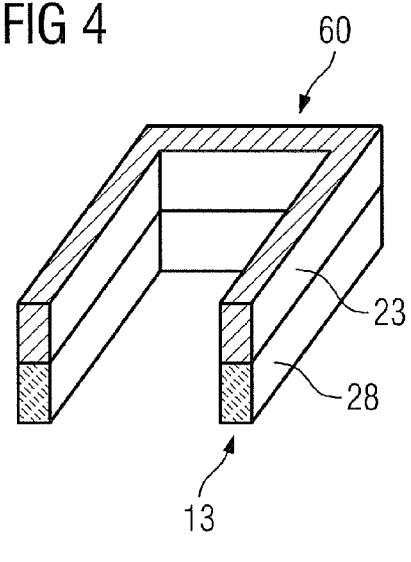
Figure 5:
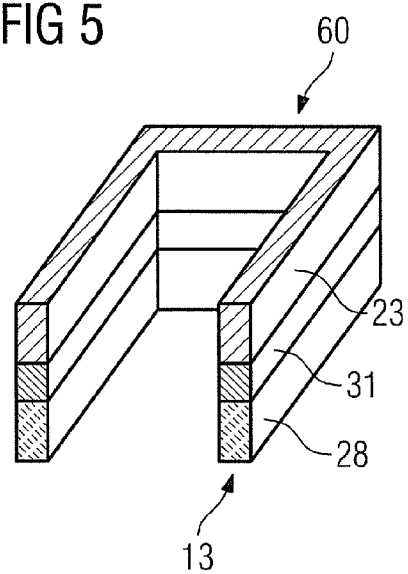

The active cooling relates in an entirely general form to any desired shape of an inert gas tube 60 (FIGS. 3 to 5).

The cooling preferably extends to the end 13 of the inert gas tube 60, but at least to the end of the metallic part of the inert gas tube 60 (FIGS. 3, 5).

In addition, the active cooling prevents the inert gas tube 60 from melting and inert gas flowing out of the inert gas tube 60 from not being heated (decrease in sealing).

In the embodiment shown in FIG. 3 (section through FIG. 2), the inert gas tube 60, which is likewise preferably rectangular, preferably has copper or a copper alloy in a block 31 at least at the end 13, in particular only at the end 13.

In any case, the block 31 of the end 13 of the inert gas tube 60 has a higher thermal conductivity than the upper part 23 of the inert gas tube 60.

The end 31 means not more than 30% of the length of the inert gas tube 60, seen in the longitudinal direction of the inert gas tube 60.

The end 13 of the inert gas tube 60 occurs where the wire 30 emerges from the wire feed 27.

The upper part 23 is preferably longer than the block 31.

The copper block 31 of the inert gas tube 60 makes it possible to better dissipate the heat which is created in the gap 10 during welding.

In this case as well, the inert gas tube 60 is preferably likewise cooled via cooling lines, preferably on the end faces (not illustrated).

FIG. 4 shows a further exemplary embodiment of the invention, in which the inert gas tube 60 has a wear step 28 at the end 13, that is to say it is not formed from the same material as the upper part 23.

This is preferably a ceramic.

Half of the inert gas tube 60 can preferably be formed from the wear material, and the inert gas tube 60 may be metallic in the upper part 23, that is to say in the area above the opening of the gap 10, with a lower area 28 having the wear-resistant material, in particular ceramic.

The end 28 means no more than 30% of the length of the inert gas tube 60, seen in the longitudinal direction of the inert gas tube 60.

The area 28 can be attached by active soldering or screw connection to an upper part 23, in particular a metallic part. In particular, the area 28 is attached detachably, as a result of which it can be replaced easily.

FIG. 5 shows a further exemplary embodiment of the invention, in which the end 13 of the inert gas tube 60 is ceramic.

A copper block 31 is preferably provided directly above the ceramic end 28 of the inert gas tube 60, which forms the end 13 of the inert gas tube, as an example of a material with a higher thermal conductivity, which is preferably cooled (FIG. 5=FIG. 2+"28" at the end).

The use of ceramic makes the inert gas tube 60 more temperature-resistant, with this capability being enhanced by the copper block or the cooled copper block.

As shown in FIGS. 2 to 5, these measures can also be combined with one another as required in order to achieve improved welding results.

Figure 6:
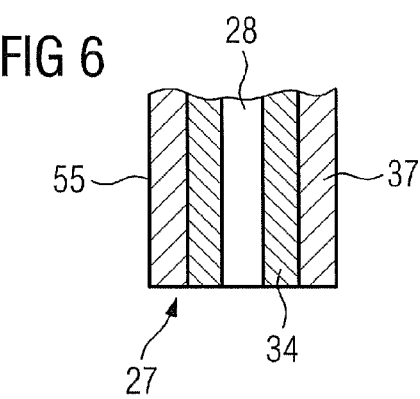

FIG. 6 shows a cross section through the contact tube 27.

The contact tube 27 with the wire feed 28 comprises the inner core 34 (34 is hollow) being formed from a first material, preferably a material containing copper, and on the outside (jacket) 37 from a metallic material which does not contain copper.

The first material in the inner core 34 preferably has a higher thermal conductivity than the second material, that is to say it is not the same as the second material. In particular, the inner core 34 is cooled (not illustrated). A copper tube 34 and a tube 37 which does not contain copper are preferably used.

A steel is preferably used for the outer tube, the jacket 37.

The jacket 37 rests directly on the inner core 34 and is preferably connected to it.

The jacket 37 sheaths the inner core 34 over at least 90% of its jacket area 34 (FIGS. 11, 12).

The contact tube 27 may likewise be composed of a material, and may be cooled.

Figure 7:
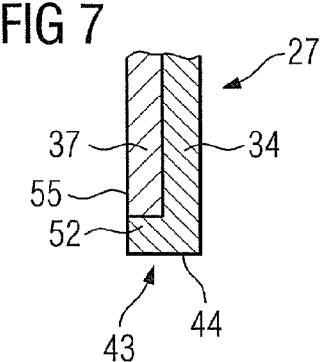

FIG. 7 shows one particular embodiment of FIG. 6, in which the outer surface 55 of the contact tube 27 at the end 43 of the contact tube 27 is likewise formed by the first material, that is to say preferably a material containing copper, that is to say the inner core 34 is in this case L-shaped and represents a part of the outer surface, that is to say a part of the jacket surface 55 of the contact tube 27, as well as the end face 44 of the contact tube 27.

Figure 8:
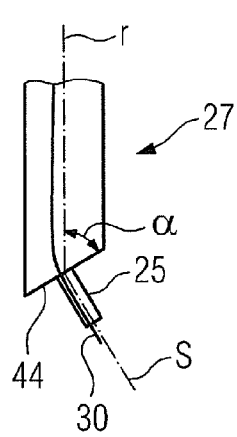

FIG. 8 shows a further exemplary embodiment of the contact tube 27.

The end face 44 of the contact tube 27 is in this case inclined. Inclined means that the angle α between the end face 44 (a plane) and the rotation axis/longitudinal axis r of the contact tube 27 is not 90°.

A contact nozzle 25 has a thinner cross section than the contact tube 27. The contact nozzle 25 is preferably formed at right angle on the inclined end face 44, that is to say a longitudinal axis S of the contact nozzle 25 is at right angles to the end face 44.

Figure 9:
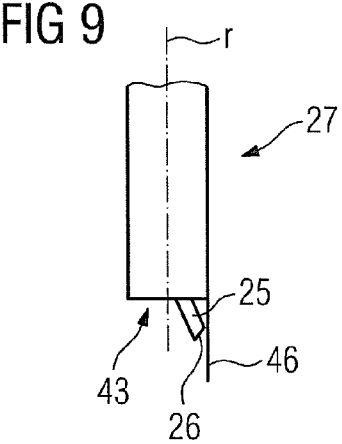

FIG. 9 shows a further schematic illustration of the contact tube 27.

The outer jacket surface of the contact tube 27 forms a further imaginary sheath 46 over the end 43 of the contact tube 27. The outermost tip 26 of the contact nozzle 25 preferably does not project beyond the sheath 46.

This preferably also applies to an inclined end face 44 as shown in FIG. 8, as is illustrated in FIG. 13.

As can be seen from FIG. 10, at the end 43, in particular only at the end 43, the contact tube 27 has a non-stick coating 49, in particular a ceramic layer 49.

The coating 49 prevents welding material from being deposited on the contact tube 27.

The end 43 means no more than 30% of the length of the contact tube, seen in the longitudinal direction of the contact tube 27.

The ceramic coating 49 is a ceramic coating, preferably plus a Teflon coating or only a Teflon coating. Any other non-stick coating can also be used instead of ceramic, Teflon or ceramic/Teflon.

FIG. 11 shows a combination of the exemplary embodiments shown in FIG. 10 and FIG. 7.

In particular, the inner core 34, preferably the copper part of the outer surface 55 of the contact tube 27, is not covered by the protective coating 49. The Teflon coating may also extend over the ceramic layer 49 to the end of the contact tube 27.

The protective coating 49 may likewise also extend onto the part 52 of the material 34 (FIG. 12).

FIG. 14 shows a further exemplary embodiment of a contact tube 27 with a contact nozzle 25 which essentially has the same cross section as the contact tube 27, with the wire feed 28 being bent in the interior of the contact nozzle 25, such that the wire 30 emerges from the contact tube 27 inclined with respect to the end face 44 of the contact tube 27.

The outlet opening of the contact tube 27 at the end 44 therefore preferably also does not project beyond the imaginary jacket surface 46.

Likewise, the apparatus (SE) according to the contact tube 27 or the method can be used in order to apply only one coating within a gap in an individual component.

The apparatus (SE) likewise has the capability for the oscillating movement not to be carried out symmetrically, but for the inert gas tube and/or the welding installation to be readjusted with respect to the gap because of changes during the course of the method (heating, no optimum alignment of splitting from the inert gas tube, . . . ). This can be done automatically or by a manual action by an operator.

The invention claimed is:

1. An apparatus for narrow-gap welding, comprising:
an inert gas tube; and
a contact tube including a wire feed for a melting wire,
wherein the inert gas tube includes materials with a high thermal conductivity only at the end of the inert gas tube,
wherein a first metallic material at a first end section of the inert gas tube has a higher thermal conductivity than a second material at an upper section of the inert gas tube,
wherein the first metallic material is molybdenum, tungsten, an alloy of molybdenum or tungsten, or copper or a copper alloy, and
wherein the inert gas tube is rectangular.

2. The apparatus as claimed in claim 1,
wherein the inert gas tube includes a plurality of cooling tubes at the end of the inert gas tube in order to provide active cooling, and
wherein the end of the inert gas tube occurs where the melting wire emerges from the wire feed.

3. The apparatus as claimed in claim 1,
wherein a second end section of the inert gas tube is ceramic, and
wherein the second end section is disposed at the end of the inert gas tube.

4. The apparatus as claimed in claim 1,
wherein the contact tube is formed from an inner core comprising a second material and an outer jacket comprising a first material,
wherein the outer jacket sheaths at least 90% of the inner core,
wherein the first material is not the same as the second material,
wherein the second material has an alloy with a high thermal conductivity,
wherein a second thermal conductivity of the second material is higher than a first thermal conductivity of the first material, and
wherein the second material is copper or a copper alloy.

5. The apparatus as claimed in claim 4,
wherein only at the end of the contact tube, the inner core forms a part of the outer jacket surface of the contact tube.

6. The apparatus as claimed in claim 1,
wherein the contact tube is formed from an inner core and an outer jacket,
wherein at an end of the contact tube on the outer jacket surface, the contact tube has a non-stick coating,
wherein the non-stick coating is ceramic, and
wherein the non-stick coating is applied to the outer jacket or to the inner core.

7. The apparatus as claimed in claim 6, wherein the non-stick coating does not extend over an outer surface which is formed by the inner core of the contact tube.

8. The apparatus as claimed in claim 1,
wherein the contact tube includes an end with an end face and the contact tube also includes a longitudinal axis, and
wherein the longitudinal axis forms an angle other than 90° with the end face of the end.

9. The apparatus as claimed in claim 1,
wherein the contact tube includes a contact nozzle at the end of the contact tube,
wherein the contact tube includes a jacket surface, and
wherein one end of the contact nozzle does not project beyond an imaginary extension of the jacket surface in a longitudinal direction of the contact tube.

10. The apparatus as claimed in claim 1, wherein the contact tube is coolable in an interior of the contact tube.

11. The apparatus as claimed in claim 3,
wherein the second end section of inert gas tube is ceramic at the end of the inert gas tube, and
wherein the first end section which includes higher thermal conductivity than the second end section is provided above the second end section.

12. The apparatus as claimed in claim 1, wherein before emerging from the contact tube, the wire feed has a bent profile for the melting wire.

\* \* \* \* \*